United States Patent
Amer et al.

(10) Patent No.: US 10,334,276 B2
(45) Date of Patent: Jun. 25, 2019

(54) METHOD AND APPARATUS FOR DETERMINING THE SEVERITY OF CORRUPTION IN A PICTURE

(71) Applicant: ATI TECHNOLOGIES ULC, Markham (CA)

(72) Inventors: Ihab Amer, Markham (CA); Gabor Sines, Markham (CA); Khaled Mammou, Markham (CA); Haibo Liu, Markham (CA); Edward Harold, Markham (CA); Lei Zhang, Markham (CA); Fabio Gulino, Markham (CA); Ehsan Mirhadi, Markham (CA); Ho Hin Lau, Markham (CA)

(73) Assignee: ATI Technologies ULC, Markham (CA)

( * ) Notice: Subject to any disclaimer, the term of this patent is extended or adjusted under 35 U.S.C. 154(b) by 411 days.

(21) Appl. No.: 14/981,835

(22) Filed: Dec. 28, 2015

(65) Prior Publication Data
US 2017/0188051 A1    Jun. 29, 2017

(51) Int. Cl.
| H04N 19/44 | (2014.01) |
| H04N 19/65 | (2014.01) |
| H04N 21/44 | (2011.01) |
| H04N 21/442 | (2011.01) |
| H04N 21/6375 | (2011.01) |

(52) U.S. Cl.
CPC ............. *H04N 19/65* (2014.11); *H04N 19/44* (2014.11); *H04N 21/44008* (2013.01); *H04N 21/44209* (2013.01); *H04N 21/6375* (2013.01)

(58) Field of Classification Search
CPC ..................................................... H04N 19/65
See application file for complete search history.

(56) References Cited

U.S. PATENT DOCUMENTS

| 4,552,781 A | * | 11/1985 | Cannady, Jr. | .......... D21H 23/42 |
| | | | | 427/373 |
| 5,013,403 A | * | 5/1991 | Chase | ...................... G01N 3/08 |
| | | | | 162/198 |
| 5,146,097 A | * | 9/1992 | Fujiwara | ................ G01N 21/57 |
| | | | | 250/359.1 |

(Continued)

FOREIGN PATENT DOCUMENTS

EP            1 827 009        8/2007

*Primary Examiner* — Jayanti K Patel
*Assistant Examiner* — Irfan Habib

(57) ABSTRACT

An encoder encodes pixels representative of a picture in a multimedia stream, generates a first approximate signature based on approximate values of pixels in a reconstructed copy of the picture, and transmits the encoded pixels and the first approximate signature. A decoder receives a first packet including the encoded pixels and the first approximate signature, decodes the encoded pixels, and transmits a first signal in response to comparing the first approximate signature and a second approximate signature generated based on approximate values of the decoded pixels. If a corrupted packet is detected, the multimedia application requests an intra-coded picture in response to the first approximate signature differing from the second approximate signature. The second signal instructs the decoder to bypass requesting an intra-coded picture and to continue decoding received packets in response to the first approximate signature being equal to the second approximate signature.

19 Claims, 9 Drawing Sheets

(56) References Cited

U.S. PATENT DOCUMENTS

| | | | | |
|---|---|---|---|---|
| 5,853,543 A * | 12/1998 | Hu | ............... | D21G 9/0027 162/198 |
| 6,006,602 A * | 12/1999 | Preston | ............... | G01G 17/02 162/198 |
| 6,099,690 A * | 8/2000 | Hu | ............... | D21F 7/003 162/198 |
| 6,517,679 B1 * | 2/2003 | Mustonen | ............... | D21G 9/0027 162/198 |
| 6,519,534 B2 * | 2/2003 | Chen | ............... | D21F 7/04 702/182 |
| 6,712,936 B2 * | 3/2004 | Hamad | ............... | D21F 11/00 162/198 |
| 7,233,619 B1 * | 6/2007 | Roman | ............... | H04N 19/93 375/240 |
| 7,321,425 B2 * | 1/2008 | Haran | ............... | G01J 3/1256 250/339.01 |
| 7,688,447 B2 * | 3/2010 | Shakespeare | ............... | G01J 3/10 356/402 |
| 7,880,156 B2 * | 2/2011 | Shakespeare | ............... | G01N 21/4795 250/226 |
| 8,017,927 B2 * | 9/2011 | Shakespeare | ............... | B41F 33/0045 250/559.04 |
| 8,176,524 B2 * | 5/2012 | Singh | ............... | H04N 21/2402 370/352 |
| 8,189,686 B2 * | 5/2012 | Boyes | ............... | H04N 17/004 375/224 |
| 8,313,605 B2 * | 11/2012 | Yamamoto | ............... | B32B 7/06 156/248 |
| 8,363,967 B2 * | 1/2013 | Mim | ............... | H04N 19/176 382/233 |
| 8,463,560 B2 * | 6/2013 | Allan | ............... | G01N 3/32 162/263 |
| 8,526,745 B2 * | 9/2013 | Liu | ............... | H04N 19/70 382/232 |
| 8,618,929 B2 * | 12/2013 | Ganapathy | ............... | B65G 43/02 340/539.1 |
| 8,665,967 B2 * | 3/2014 | Ngo | ............... | H04N 19/37 375/240.02 |
| 8,750,732 B2 * | 6/2014 | Ishii | ............... | G01N 21/4738 324/754.23 |
| 8,774,270 B2 * | 7/2014 | Park | ............... | H04N 19/70 375/240.08 |
| 8,877,010 B2 * | 11/2014 | Saren | ............... | D21G 9/0018 162/198 |
| 9,071,849 B2 * | 6/2015 | Yoon | ............... | H04N 19/593 |
| 9,277,057 B2 * | 3/2016 | Rabipour | ............... | H04M 7/0072 |
| 2003/0123659 A1 * | 7/2003 | Forstrom | ............... | G06T 1/0021 380/205 |
| 2006/0114987 A1 * | 6/2006 | Roman | ............... | H04N 7/142 375/240.01 |
| 2007/0202843 A1 * | 8/2007 | Niu | ............... | H04N 19/89 455/403 |
| 2008/0002894 A1 * | 1/2008 | Hayon | ............... | G06F 3/1462 382/232 |
| 2010/0195742 A1 * | 8/2010 | Wu | ............... | H03M 7/4006 375/240.27 |
| 2012/0020579 A1 * | 1/2012 | Choi | ............... | H04N 19/124 382/233 |
| 2012/0106636 A1 * | 5/2012 | Kim | ............... | H04N 19/176 375/240.12 |
| 2013/0279606 A1 * | 10/2013 | Vanam | ............... | H04N 19/172 375/240.27 |
| 2014/0092997 A1 * | 4/2014 | Zhou | ............... | H04N 19/44 375/240.27 |
| 2015/0222918 A1 * | 8/2015 | Song | ............... | H04N 19/577 375/240.12 |

* cited by examiner

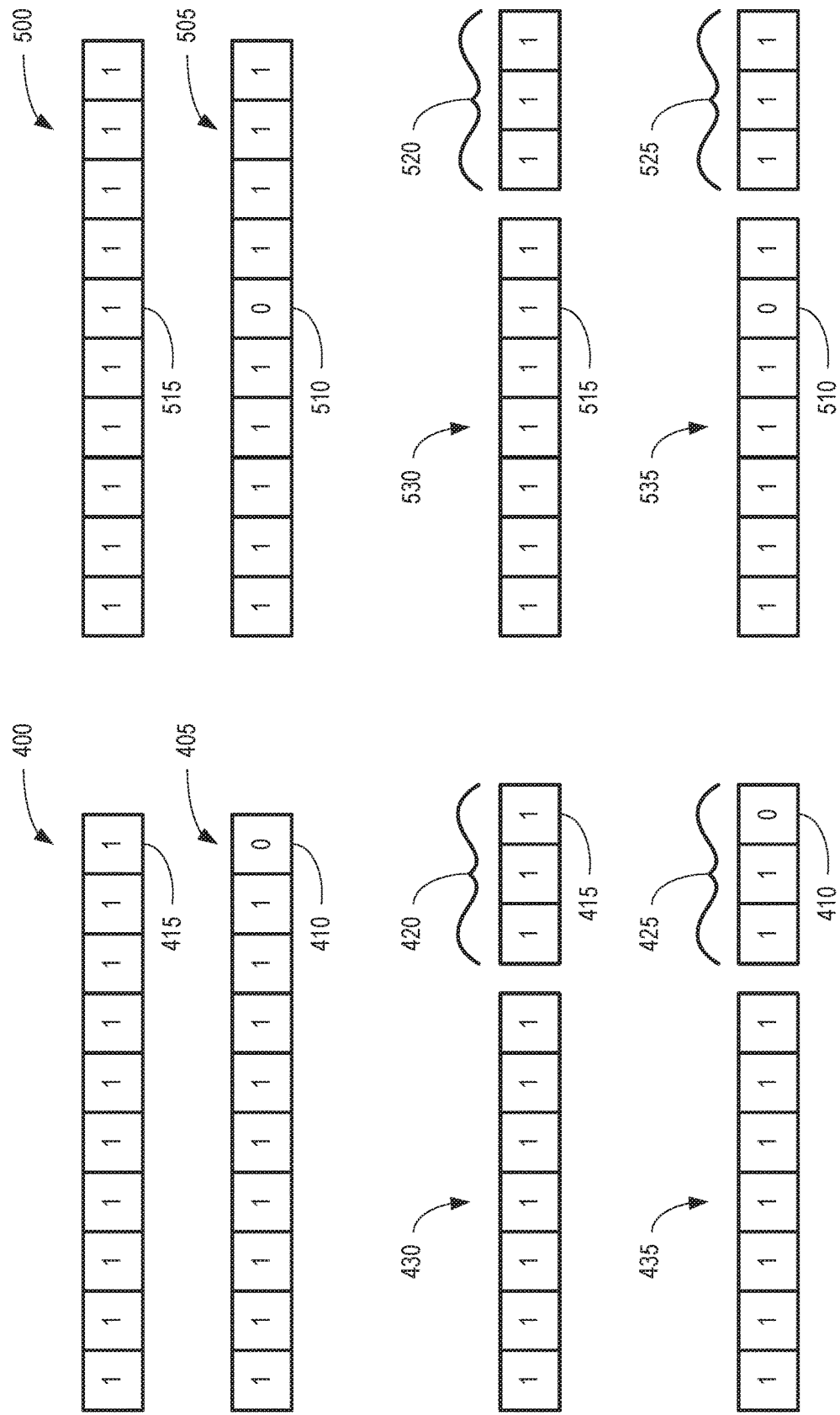

METHOD AND APPARATUS FOR DETERMINING THE SEVERITY OF CORRUPTION IN A PICTURE

BACKGROUND

Field of the Disclosure

The present disclosure relates generally to communication systems and, more particularly, to encoding and decoding of pictures in a communication system.

Description of the Related Art

Video or multimedia servers generate data representative of pictures in a video stream, e.g., a video stream that has been requested by a user. An encoder encodes the data for each picture to form a bitstream that is transmitted over a network to a decoder that decodes the bitstream and provides the decoded information to a video or multimedia application for display to the user. The encoded packets can be corrupted during transmission so that one or more of the bits in the bitstream received at the decoder differs from the corresponding one or more bits in the bitstream transmitted by the encoder. Network layer entities can detect errors in received packets. Any corrupted packets are typically dropped and consequently they are not decoded by the decoder.

Conventional encoders implement video compression algorithms that use information from more than one picture to encode some types of received pictures. For example, an intra-coded picture (such as an I-frame) is a fully specified picture that is encoded and decoded without reference to any other picture. A predicted picture (such as a P-frame) is encoded and decoded with reference to one or more previous pictures and therefore typically requires fewer bits to encode than an intra-coded picture. A bi-directional predicted picture (such as a B-frame) is encoded and decoded with reference to one or more previous pictures and/or one or more subsequent pictures. The bi-directional predicted picture typically requires fewer bits to encode than an intra-coded picture or a predicted picture. Encoding and decoding pictures based on previous or subsequent pictures reduces the amount of information transmitted between the encoder and the decoder, as well as reducing the workload at the decoder. However, dropped packets break the chain of pictures that determines the state of the decoder, which may cause significant errors in subsequently decoded pictures.

Conventional decoders typically respond to dropped packets in one of two ways: (1) "freezing" the video at the last successfully decoded frame until a new intra-coded picture is received or (2) continuing to decode subsequent pictures based on the last successfully decoded picture. Both approaches have significant drawbacks. Freezing the video may unnecessarily degrade the user experience for minor corruption of the picture. For example, a packet may be dropped if a single bit in a frame is flipped from 0 to 1, which may cause the video stream to freeze until the next intra-coded picture is received. However, continuing to decode pictures received after the dropped packet may cause significant errors to propagate to (and in some cases be amplified in) pictures that are encoded based on previous or subsequent pictures.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 4 is a diagram illustrating an example of bits representative of a transmitted pixel and a received pixel that includes a corrupted bit in a masked portion according to some embodiments.

FIG. 5 is a diagram illustrating an example of bits representative of a transmitted pixel and a received pixel that includes a corrupted bit in an unmasked portion according to some embodiments.

DETAILED DESCRIPTION

A lost packet generated by a multimedia application can corrupt a successfully received packet that is encoded on the basis of the lost packet. For example, a packet that is representative of at least a portion of a picture of a scene can be encoded as a P-frame using information in another packet that represents at least a portion of a picture of the scene one frame earlier than the picture in the first packet. If the other packet is lost in transmission, the decoder can replace the lost packet with a replica of a previously received packet and attempt to decode the subsequently received packet on the basis of the replica packet instead of the lost packet. However, the replica packet is likely to differ from the lost packet, which can lead to corruption of the successfully received packet during decoding. As described herein, a decoder can assess the severity of the corruption, and thereby assist the corresponding multimedia application in deciding how to recover from the corruption, such as by generating a first approximate signature for a picture based on approximate values of pixels representative of the picture and comparing the first approximate signature to a second approximate signature for the picture generated by an encoder based on approximate values of pixels in a reconstructed copy of the picture.

As also described herein, the encoder generates the reconstructed copy based on the current picture and, in some cases, one or more previous or subsequent reconstructed pictures. The first and second approximate signatures may be generated by hashing or applying a cyclic redundancy check (CRC) to a selected subset of the bits representative of each pixel in the picture. The first and second approximate signatures may also be generated by grouping the pixels into blocks, averaging the values of the pixels in each block, and then hashing or applying a CRC to the average values for the blocks in the picture. In some embodiments, the selection of subsets of the bits in each pixel and averaging pixel values over blocks may both be performed prior to hashing or applying the CRC to generate the first and second approximate signatures. The decoder may also decide whether to freeze the picture or request an intra-coded picture based on the comparison of the first and second approximate signatures. Some embodiments of the decoder provide a signal to the multimedia application indicating whether the first approximate signature matches the second approximate signature, e.g., to indicate whether the quality of the decoded picture is sufficient.

Figure 1:
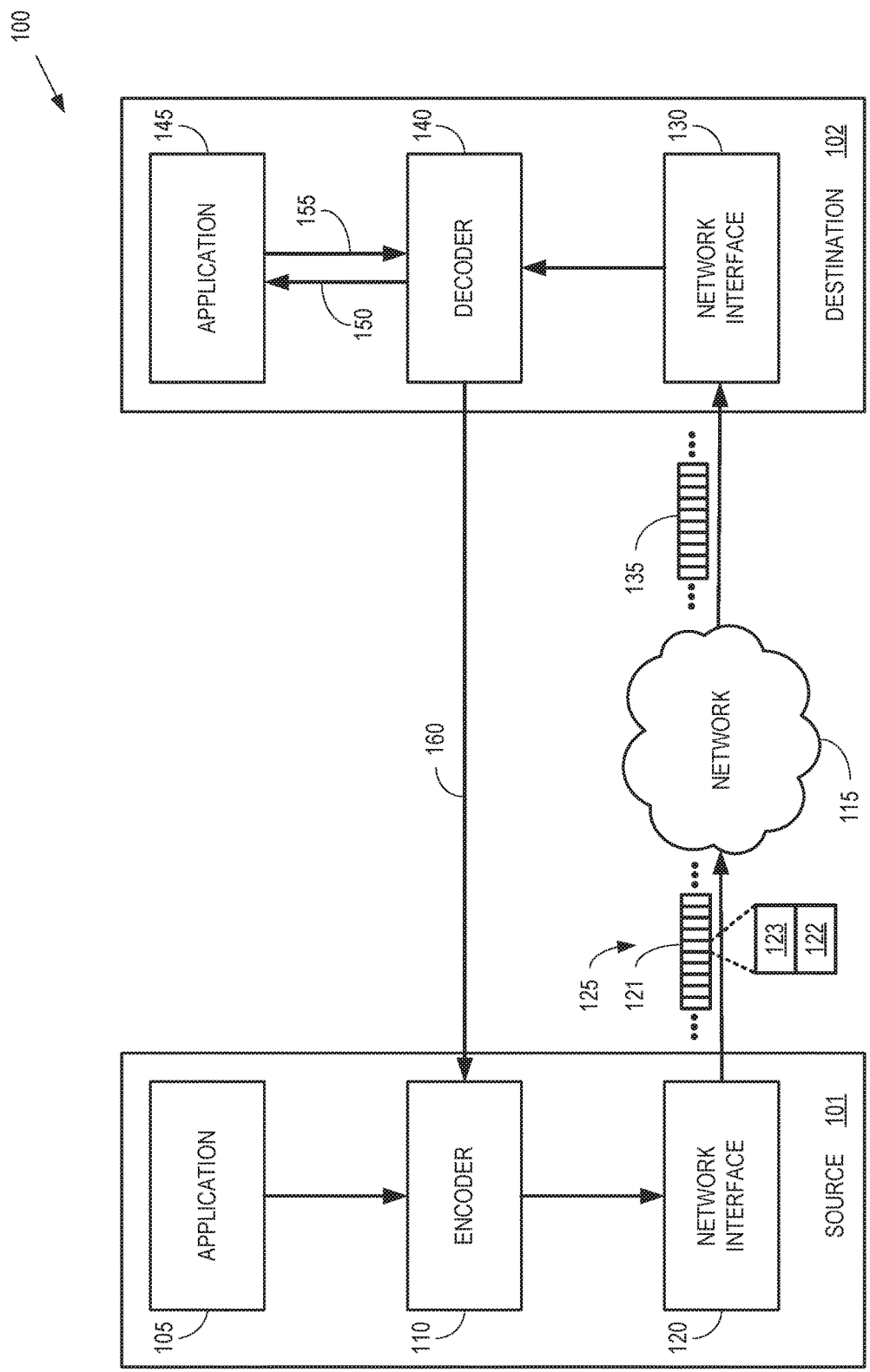
FIG. 1 is a block diagram of a communication system that is used to support multimedia applications according to some embodiments.

FIG. 1 is a block diagram of a communication system 100 that is used to support multimedia applications according to some embodiments. The communication system 100 includes a source device 101 and a destination device 102. The source device 101 includes one or more processors (not shown) that are configured to execute a multimedia application 105 that generates information representative of a multimedia stream. The application 105 is implemented as a set of executable instructions that are executed by the one or more processors and which manipulate the one or more processors and other computing resources to perform the functionality described herein. For example, the application 105 may generate digital information that represents a stream or sequence of pictures in a multimedia stream. As used herein, the term "picture" refers to a spatially distinct portion of a frame of the multimedia stream that is encoded separately from other portions of the frame. A picture is sometimes referred to as a "slice" of the frame. The term "multimedia" refers to either video only or a combination of video and audio.

The application 105 provides the digital information representative of a stream of pictures to an encoder 110 that encodes the digital information for transmission over a network 115 such as a wide area network (WAN), an intranet, an Internet, a wireless network, and the like. For example, the encoder may be used to encode the digital information according to an encoding standard such as MPEG-2, MPEG-4, AVC, and the like. The encoder 110 may be may be a hardware encoder or software executed by the one or more processors. The encoder 110 can encode information representative of the pictures generated by the application 105 without reference to any other pictures. For example, the encoder 110 can generate intra-coded pictures (which may also be referred to as I-frames) using only information representative of the current picture and without reference to any previously or subsequently encoded pictures. As used herein, the terms "previous" and "subsequent" referred to relative positions of the pictures in encoding or decoding order. The encoder may also encode the picture based on one or more previously or subsequently encoded pictures. For example, the encoder 110 can generate predicted pictures (which may also be referred to as P-frames) using information representative of the current picture and one or more previous pictures. A predicted picture may include image data, motion vector displacements of features in the picture relative to corresponding features in the one or more previous pictures, or a combination thereof. For another example, the encoder 110 can generate bidirectional predicted pictures (which may also be referred to as B-frames) using information representative of the current picture, one or more previous pictures in decoding order, and one or more subsequent pictures. A bidirectional predicted picture may include image data, motion vector displacements of features in the picture relative to corresponding features in the previous or subsequent pictures, or ignition thereof.

A network interface 120 receives the encoded information for each picture and encapsulates the information in one or more packets 121. Some embodiments of the network interface 120 are implemented at a network layer. The network interface 120 places the encoded information in a payload 122 of the packet 121 and appends a header 123 to the packet. Some embodiments of the header 123 include information indicating the source address of the information, a destination address of the information, and other information such as an error correction code (ECC) or a cyclic redundancy check (CRC) that can be used to detect errors in the information in the payload 122 of the packet 121. The packetized information is then transmitted over the network 115 as a bitstream 125, which is referred to as the transmitted bitstream 125.

The destination device 102 includes one or more processors (not shown) that may be used to implement one or more of a network interface 130, a decoder 140, and an application 145. For example, the application 145 may be implemented as a set of executable instructions that are executed by the one or more processors and which manipulate the one or more processors and other computing resources to perform the functionality described herein. The decoder 140 may be implemented as a hardware decoder or a software decoder, e.g., as a set of executable instructions. The source device 101 and the destination device 102 are depicted in FIG. 1 as single entities. However, some embodiments of the source device 101 or the destination device 102 are implemented as multiple devices that can exchange signals. For example, the source device 101 may be implemented as a first device (such as a camera or a processor configured to generate multimedia) that implements the application 105 and a second device that implements the encoder 110 and the network interface 120. For another example, the destination device 102 may be implemented as a first device (such as a display or a graphics card) that implements the application 145 and a second device that implements the decoder 140 and the network interface 130.

The network interface 130 receives a bitstream 135 from the network 115 in response to the network interface 120 transmitting the bitstream 125. The network interface 130 may be implemented at a network layer. The received bitstream 135 represents the transmitted bitstream 125 and thus should include the same bits in the same order as the bitstream 125 in the absence of any corruption. However, in some cases, one or more bits in the received bitstream 135 may differ from the bits in the transmitted bitstream 125, e.g., due to noise in the network 115 that introduces errors by changing the values of the bits as the bitstream 125 traverses the network 115. The network interface 130 can detect the errors in the received bitstream 135 based on header information such as an ECC or a CRC that is calculated based on the bits in the transmitted bitstream 125. Some embodiments of the network interface 130 may be able to correct some errors in a corrupted packet using the ECC in the header of the packet. However, the network interface 130 may be required to drop corrupted packets if the network interface 130 is not able to correct the detected errors, either because the errors are too extensive to be corrected using the ECC or because no ECC was transmitted in the header of the packet.

The network interface 130 forwards successfully received packets to a decoder 140. The decoder 140 decodes the encoded information representative of pictures in the multimedia stream. Intra-coded pictures are decoded without reference to any other pictures. Predicted pictures are decoded with reference to previously decoded pictures and bidirectional predicted pictures are decoded with reference to both previously decoded pictures and subsequently decoded pictures. Dropped (or lost) packets are not provided to the decoder 140, which can lead to decoding errors in predicted or bidirectional predicted pictures. Some embodiments of the decoder 140 replace the lost or dropped packets with replicas of other packets that were successfully received by the network interface 130. The decoder 140 may then attempt to decode current pictures based on the replicas instead of using the lost or dropped packets. Decoding based on replica pictures may not introduce significant errors if the replica picture is very similar to the lost or dropped packet. However, decoding based on the replica pictures may introduce substantial errors if the replica picture is substantially different than the lost or dropped packet, e.g., if the lost or dropped packet corresponds to a scene change in the multimedia stream.

Decoded pictures are provided to an application 145 that may use the decoded pictures to display the multimedia stream to a user. The decoder 140 generates a signal 150 that indicates a degree of severity of errors in the decoded pictures. Some embodiments of the signal 150 include one or more bits that indicate the degree of severity. For example, the signal 150 may include a bit that is set to "0" to indicate that the errors in a decoded picture are less than a threshold severity and a bit that is set to "1" to indicate that the errors are greater than a threshold severity. As discussed in greater detail herein, the signal 150 is generated by comparing an approximate signature generated by the encoder 110 based on encoded bits in the bitstream 125 to an approximate signature generated by the decoder 140 based on decoded bits from the bitstream 135. In the case of minor errors, the application 145 may respond by transmitting a signal 155 instructing the encoder to continue decoding newly received packets. In the case of severe errors, the application 145 may respond by transmitting the signal 155 instructing the decoder 140 to "freeze" the pictures (e.g., stop decoding newly received packets) and request an intra-coded picture from the encoder 110. The decoder 140 may then transmit a signal 160 requesting the intra-coded picture from the encoder 110 and resume decoding when it receives the intra-coded picture.

Figure 2:
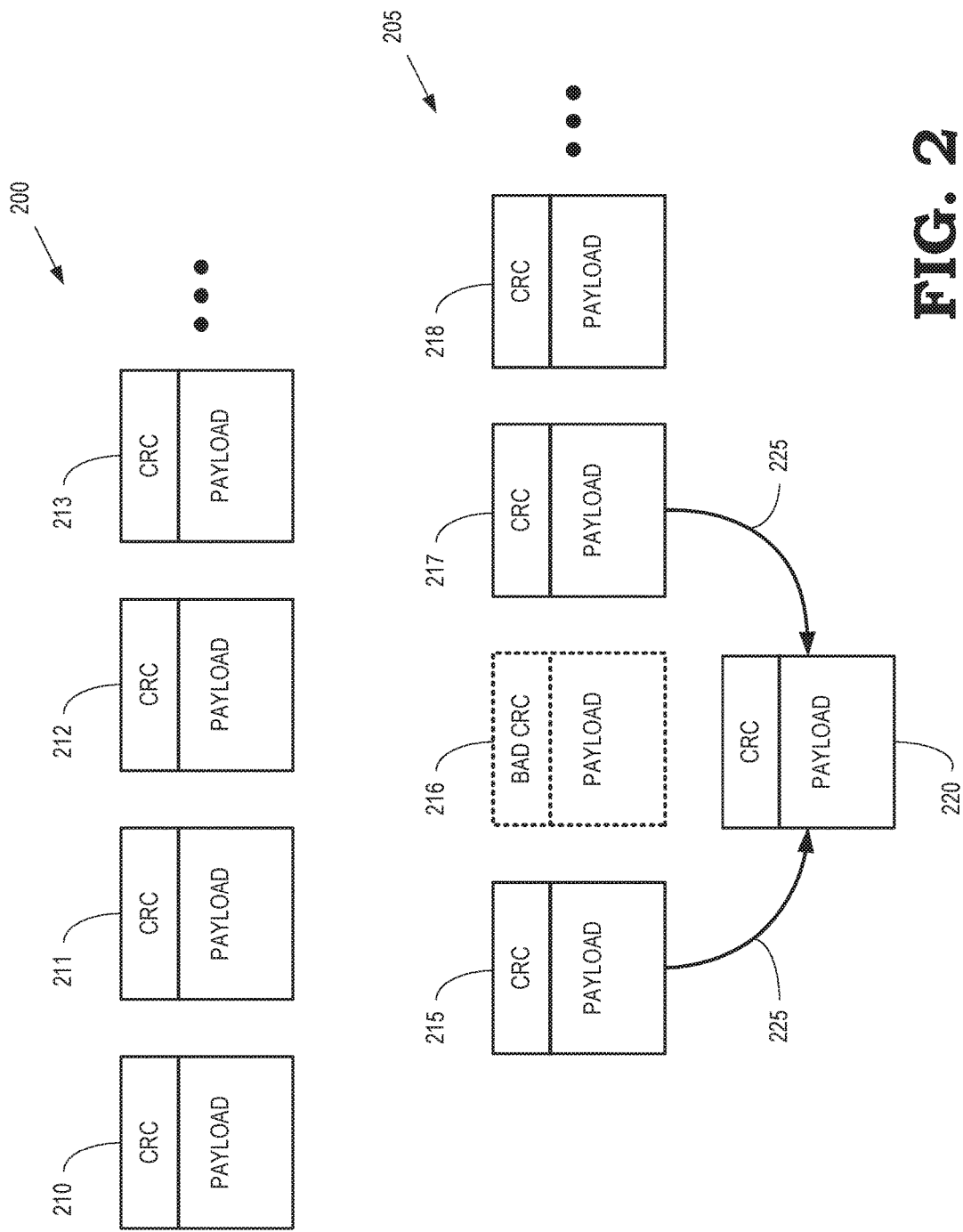
FIG. 2 is a block diagram illustrating an example of a stream of uncorrupted packets and a stream that includes a corrupted packet according to some embodiments.

FIG. 2 is a block diagram illustrating a stream 200 of uncorrupted packets and a stream 205 that includes a corrupted packet according to some embodiments. The stream 200 may represent the transmitted bitstream 125 shown in FIG. 1 or the received bitstream 135 shown in FIG. 1. The packets 210, 211, 212, 213 (referred to collectively as "the packets 210-213") of the stream 200 are formed by a network interface and include a header with a CRC value that is computed based on the bits in the corresponding payload. The packets 215, 216, 217, 218 (referred to collectively as "the packets 215-218") correspond to the packets 210-213 after transmission over a network such as the network 115 shown in FIG. 1. The packets 215, 217, 218 are correctly received, e.g., as indicated by receiving a CRC that matches a CRC calculated by the receiving network layer entity based on the received payload in the packets 215, 217, 218.

In this example, the packet 216 has been corrupted during transmission and thus the contents of the payload differ from the contents of the payload of the corresponding transmitted packet 211. The receiving network interface determines that the packet 216 is corrupted by comparing the CRC in the packet 216 to a CRC calculated based on the payload of the packet 216. In the illustrated example, the two CRC values are different (e.g., the packet 216 includes a "bad" CRC value), which indicates that the packet 216 has been corrupted. The network interface drops the packet 216 and does not provide the packet 216 to the decoder. The decoder therefore generates a replica 220 of the previously received packet 215, as indicated by the arrow 225. For example, the replica 220 may be generated using previously decoded content from the payload of the packet 215, such as a YUV frame that includes information defining a color image picture in a YUV color space that defines the luminance (Y) and chrominance (UV) components for pixels in the image. The corrupted packet 216 may only contain the bitstream associated with a portion of a picture (e.g., a slice), rather than the bitstream associated with the entire YUV frame. In this case, only the slice is dropped and the YUV region corresponding to the dropped slice is copied from the previously decoded frame. The replica 220 may be generated by copying values of bits representative of the packet 215 from one location in a memory to another location. Alternatively, the packet 215 may be "replicated" to generate the replica 220 by allowing the decoder to access values of the bits representative of the packet 215 from its previous location. The decoder may decode subsequent packets such as the packet 217 based on the replica of the packet 215, as indicated by the arrow 230.

Figure 3:
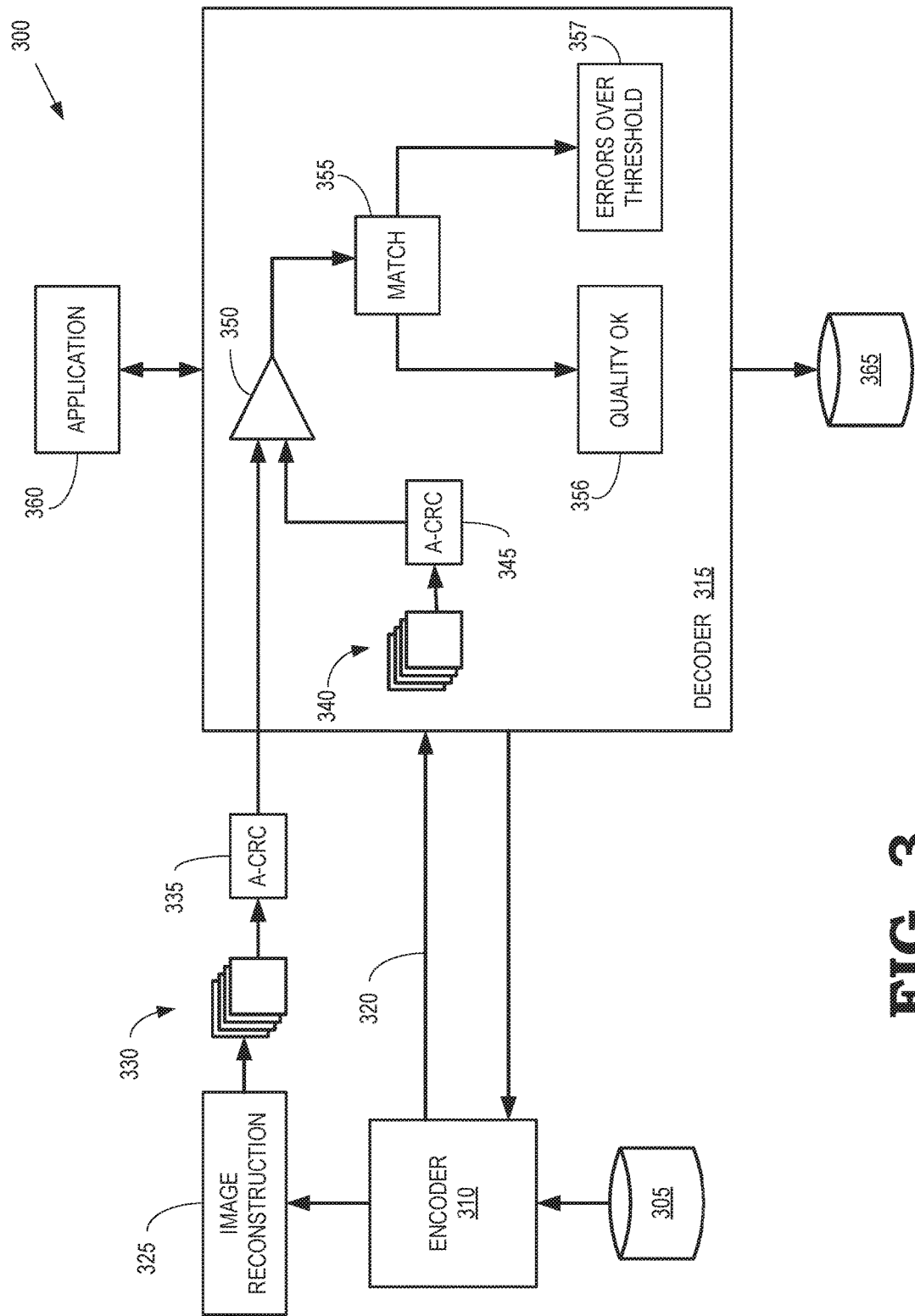
FIG. 3 is a block diagram of a communication system that uses approximate signatures to detect the severity of decoding errors caused by dropped packets according to some embodiments.

FIG. 3 is a block diagram of a communication system 300 that uses approximate signatures to detect the severity of decoding errors caused by dropped packets according to some embodiments. The communication system 300 may be used to implement some embodiments of the communication system 100 shown in FIG. 1. A data source 305 provides information representative of pictures in a multimedia stream to an encoder 310 (one embodiment of the encoder 110 of FIG. 1). For example, the data source 305 may provide information defining a color image picture in a color space such as a YUV color space. As discussed herein, the encoder 310 encodes the received information as an intra-coded picture, a predicted picture, or a bidirectional predicted picture. The encoded information is then encapsulated into packets and transmitted over a network to a decoder 315 (one embodiment of the decoder 140 of FIG. 1), as indicated by the arrow 320.

An image reconstruction module 325 also receives encoded information from the encoder 310. The image reconstruction module 325 performs a bitwise reconstruction of pictures 330 that are the same as the decoded bits that would be generated by the decoder 315 if it correctly receives uncorrupted data from the encoder 310 and successfully decodes the uncorrupted data. In the case of intra-coded data, the reconstructed pictures 330 are formed by decoding the encoded bits for corresponding pictures provided by the data source 305. However, in the case of predicted pictures or bidirectional predicted pictures, which rely on information in previously or subsequently encoded pictures, the reconstructed pictures 330 are formed by decoding the encoded bits for the corresponding pictures based on decoded bits for previously or subsequently encoded pictures.

An approximate signature, such as an approximate CRC (A-CRC) 335, is calculated based on the bits representative of the reconstructed pictures 330. For example, the approximate signature may be generated by calculating a CRC based on a subset of bits that represent values of the pixels in the picture. For another example, the approximate signature may be generated by calculating a CRC based on an average of bits that represent values of groups of pixels in the picture. The approximate signature may also be constructed using other hashing or error correction algorithms. The approximate signature is then transmitted to the decoder 315. The approximate signature may be transmitted concurrently with transmission of the packet including the corresponding encoded bits, in series with the encoded bits, interleaved with the encoded bits, or in other sequences. In some embodiments, error detection or correction bits (such as ECC or CRC bits) are also computed based on the approximate signature and transmitted with the approximate signature to detect errors in the approximate signature.

The decoder 315 decodes the received encoded bits to generate decoded pictures 340 that include bits representative of the corresponding pictures, such as the YUV images provided by the data source 305. The decoder 315 then generates an approximate signature based on the decoded bits in the decoded pictures 340. For example, the approximate signature may be an approximate CRC (A-CRC) 345 or an approximate signature calculated using other hashing or error correction algorithms. A comparator 350 is used to compare the approximate signature generated based on the encoded bits from the encoder 310 and the approximate signature generated based on the received bits. A match module 355 determines whether the approximate signatures match based on a signal provided by the comparator 350. If so, the decoder 315 determines that the severity of any errors in the decoded pictures 340 is below a specified threshold that indicates that the quality of the decoded pictures 340 is acceptable and a module 356 generates a corresponding OK signal to indicate that the severity is below the threshold severity. If the approximate signatures do not match, the decoder 315 determines that the severity of any errors in the decoded pictures 340 is above the threshold and may therefore negatively impact the user experience. A module 357 then generates a corresponding signal to indicate that the errors are above the threshold severity.

As discussed herein, errors in the decoded pictures 340 may result from attempting to decode pictures on the basis of replicas of previously or subsequently received packets instead of lost or dropped packets. A signal (e.g., signal 150 of FIG. 1) that indicates the results of the comparison of the approximate signatures may therefore be provided to an application 360 (one embodiment of application 145 of FIG. 1) that utilizes the decoded pictures 340 to assist the application 360 in determining how to recover from the lost or dropped packet. For example, if the signal indicates that the severity of the errors in the decoded pictures 340 is below the threshold, the application 360 may determine that the small degradation in the image quality caused by the errors is not significant enough to warrant a drop in quality that typically occurs in response to requesting an intra-coded picture. The application 360 may therefore instruct the decoder 315 to continue decoding newly received pictures. For another example, if the signal indicates that the severity of the errors in the decoded pictures 340 is above the threshold, the application 360 may instruct the decoder 315 to freeze on the current frame and request an intra-coded picture from the encoder 310.

The decoder 315 may store the decoded pictures 340 in a storage element 365, which may be implemented using a memory or storage device. The portion of the decoded pictures 340 that are stored in the storage element 365 may be determined based on the signals received from the application 360. For example, if the application 360 instructs the decoder 315 to continue decoding pictures, the decoder 315 may store substantially all of the decoded pictures 340 in the storage element 365. However, if the application 360 instructs the decoder to stop decoding pictures and request an intra-coded picture, the decoder 315 may bypass storing temporarily decoded pictures 340 that were decoded based on a replica of a lost or decoded packet or other temporarily decoded pictures 340 that were decoded prior to receiving the requested intra-coded picture.

FIG. 4 is a diagram illustrating an example of bits representative of a transmitted pixel 400 and a received pixel 405 that includes a corrupted bit in a masked portion according to some embodiments. The pixels 400, 405 may be transmitted and received in some embodiments of the bitstreams 125, 135 shown in FIG. 1 or by some embodiments of the encoder 310 and the decoder 315 shown in FIG. 3. The received bitstream 405 has been corrupted during transmission of the bitstream so that the received bit 410 differs from the corresponding transmitted bit 415. Approximate signatures may be calculated for the bits in the pixels 400, 405 by masking portions 420, 425 of the bits in the pixels 400, 405 and then applying a CRC or other hashing algorithm to the unmasked portions 430, 435. The approximate signature for the bits in the pixel 400 is equal to the approximate signature for the bits in the pixel 405 because the corrupted bit 410 is in the masked portion 425 and consequently is not used to calculate the approximate signature for the bits in the pixel 405. Although the masked portions 420, 425 shown in FIG. 4 correspond to the least significant bits of the pixels 400, 405, some embodiments may mask other portions such as the most significant bits, random bits, bits separated by an offset value, or any other subset of the bits of the pixels 400, 405.

FIG. 5 is a diagram illustrating an example of bits representative of a transmitted pixel 500 and a received pixel 505 that includes a corrupted bit in an unmasked portion according to some embodiments. The pixels 500, 505 may be transmitted and received in some embodiments of the bitstreams 125, 135 shown in FIG. 1 or by some embodiments of the encoder 310 and the decoder 315 shown in FIG. 3. In this example, the received bitstream 505 has been corrupted during transmission of the bitstream so that the received bit 510 differs from the corresponding transmitted bit 515. Approximate signatures may be calculated for the bits in the pixels 500, 505 by masking portions 520, 525 of the bits in the pixels 500, 505 and then applying a CRC or other hashing algorithm to the unmasked portions 530, 535. The approximate signature for the bits in the pixel 500 differs from the approximate signature for the bits in the pixel 505 because the corrupted bit 510 is in the unmasked portion 525 and consequently the corrupted bit 510 is used to calculate the approximate signature for the bits in the pixel 505. The difference between the approximate signatures may indicate that corruption of the pixel 505 is relatively severe.

Figure 6:
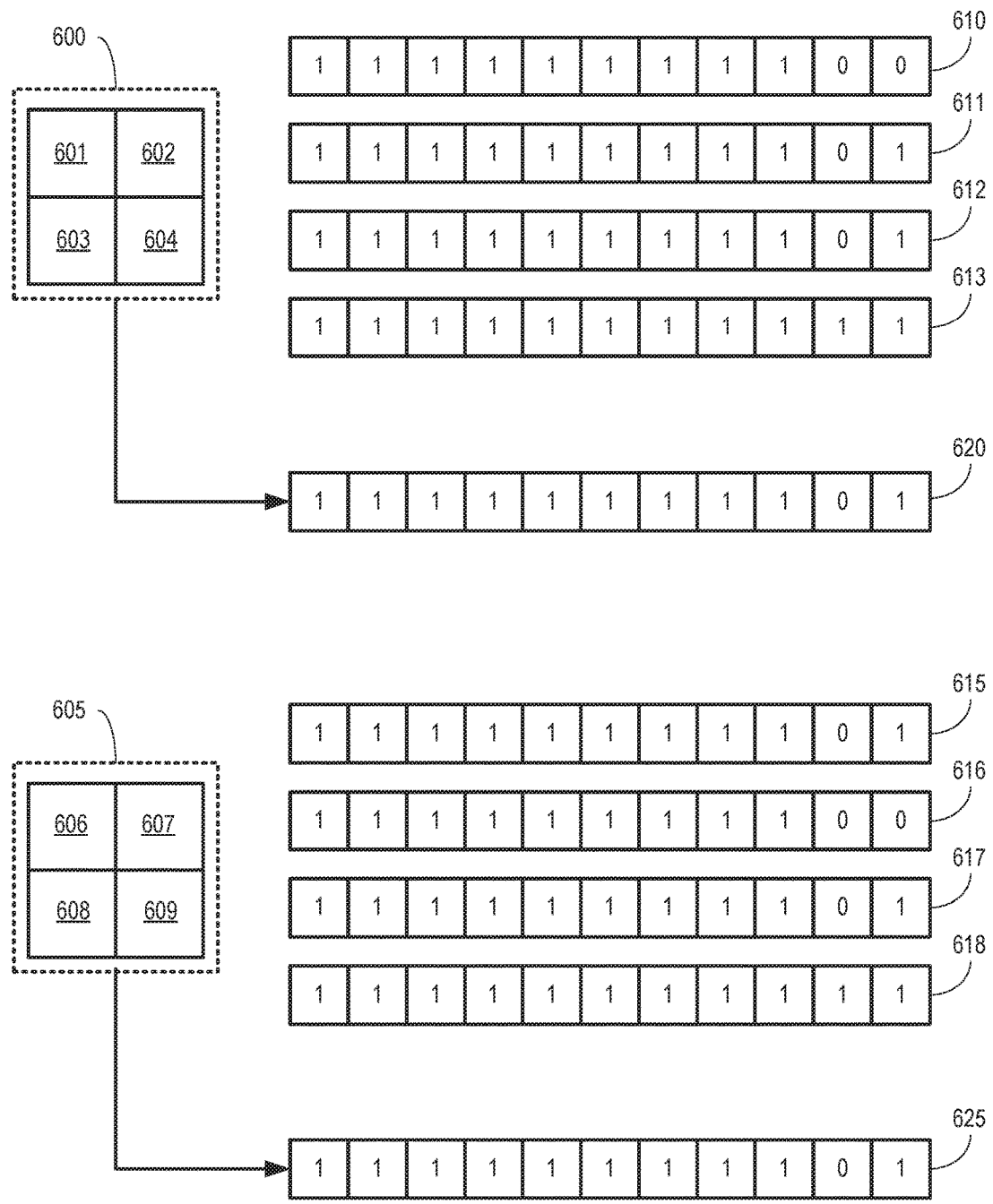
FIG. 6 is a diagram illustrating an example of a block of transmitted pixels and a block of received pixels that have the same average pixel value according to some embodiments.

FIG. 6 is a diagram illustrating an example of a block 600 of transmitted pixels 601, 602, 603, 604 and a block 605 of received pixels 606, 607, 608, 609 that have the same average pixel value according to some embodiments. The blocks 600, 605 may be transmitted and received in some embodiments of the bitstreams 125, 135 shown in FIG. 1 or by some embodiments of the encoder 310 and the decoder 315 shown in FIG. 3. The bits 610 represent the value of the pixel 601, the bits 611 represent the value of the pixel 602, the bits 612 represent the value of the pixel 603, and the bits 613 represent the value of the pixel 604. The bits 615 represent the value of the pixel 606, the bits 616 represent the value of the pixel 607, the bits 617 represent the value of the pixel 608, and the bits 618 represent the value of the pixel 609. The bits 620 represent an average value of the pixels 601-604 in the block 600. The bits 625 represent an average value of the pixels 606-609 in the block 605. Approximate signatures for the transmitted pixels 601-604 and the received pixels 606-609 are calculated by applying a CRC or other hashing algorithm to the corresponding bits 620, 625. The approximate signature for the block 600 is equal to the approximate signature for the block 605 because the bits 620 are the same as the bits 625, even though corruption has changed the bits 615 and 616 in this example. In some embodiments, the number or distribution of pixels that are grouped into blocks and averaged may differ from the embodiment illustrated in FIG. 6.

Figure 7:
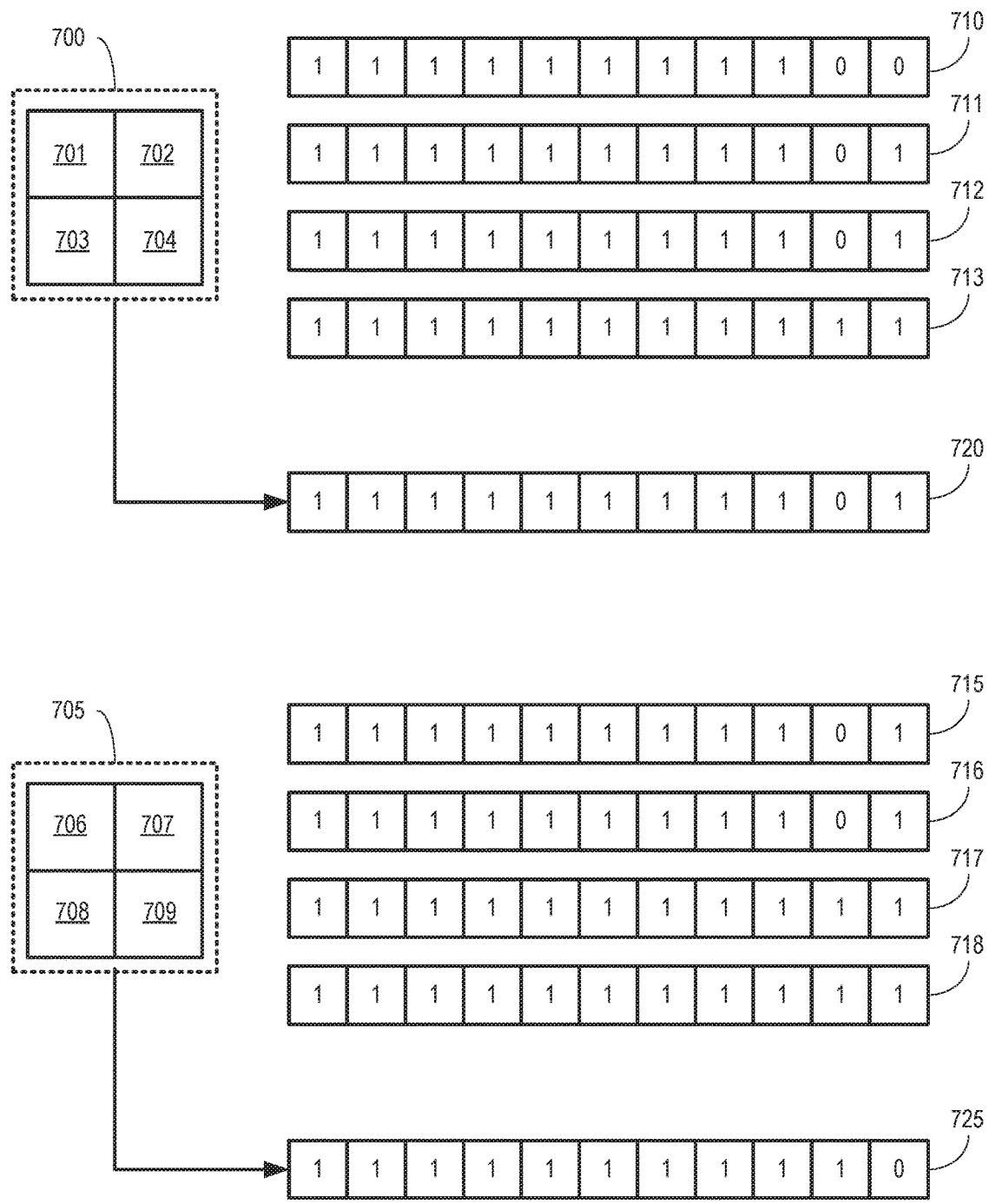
FIG. 7 is a diagram illustrating an example of a block of transmitted pixels and a block of received pixels that have different average pixel values according to some embodiments.

FIG. 7 is a diagram illustrating an example of a block 700 of transmitted pixels 701, 702, 703, 704 and a block 705 of received pixels 706, 707, 708, 709 that have different average pixel values according to some embodiments. The blocks 700, 705 may be transmitted and received in some embodiments of the bitstreams 125, 135 shown in FIG. 1 or by some embodiments of the encoder 310 and the decoder 315 shown in FIG. 3. The bits 710 represent the value of the pixel 701, the bits 711 represent the value of the pixel 702, the bits 712 represent the value of the pixel 703, and the bits 713 represent the value of the pixel 704. The bits 715 represent the value of the pixel 706, the bits 716 represent the value of the pixel 707, the bits 717 represent the value of the pixel 708, and the bits 718 represent the value of the pixel 709. The bits 720 represent an average value of the pixels 701-704 in the block 700. The bits 725 represent an average value of the pixels 706-709 in the block 705. Approximate signatures for the transmitted pixels 701-704 and the received pixels 706-709 are calculated by applying a CRC or other hashing algorithm to the corresponding bits 720, 725. The approximate signature for the block 700 is different than the approximate signature for the block 705 because the bits 720 are different than the bits 725 because, in this example, corruption has changed the bits 715 and 717 which may indicate that the corruption is relatively severe. In some embodiments, the number or distribution of pixels that are grouped into blocks and averaged may differ from the embodiment illustrated in FIG. 7.

Figure 8:
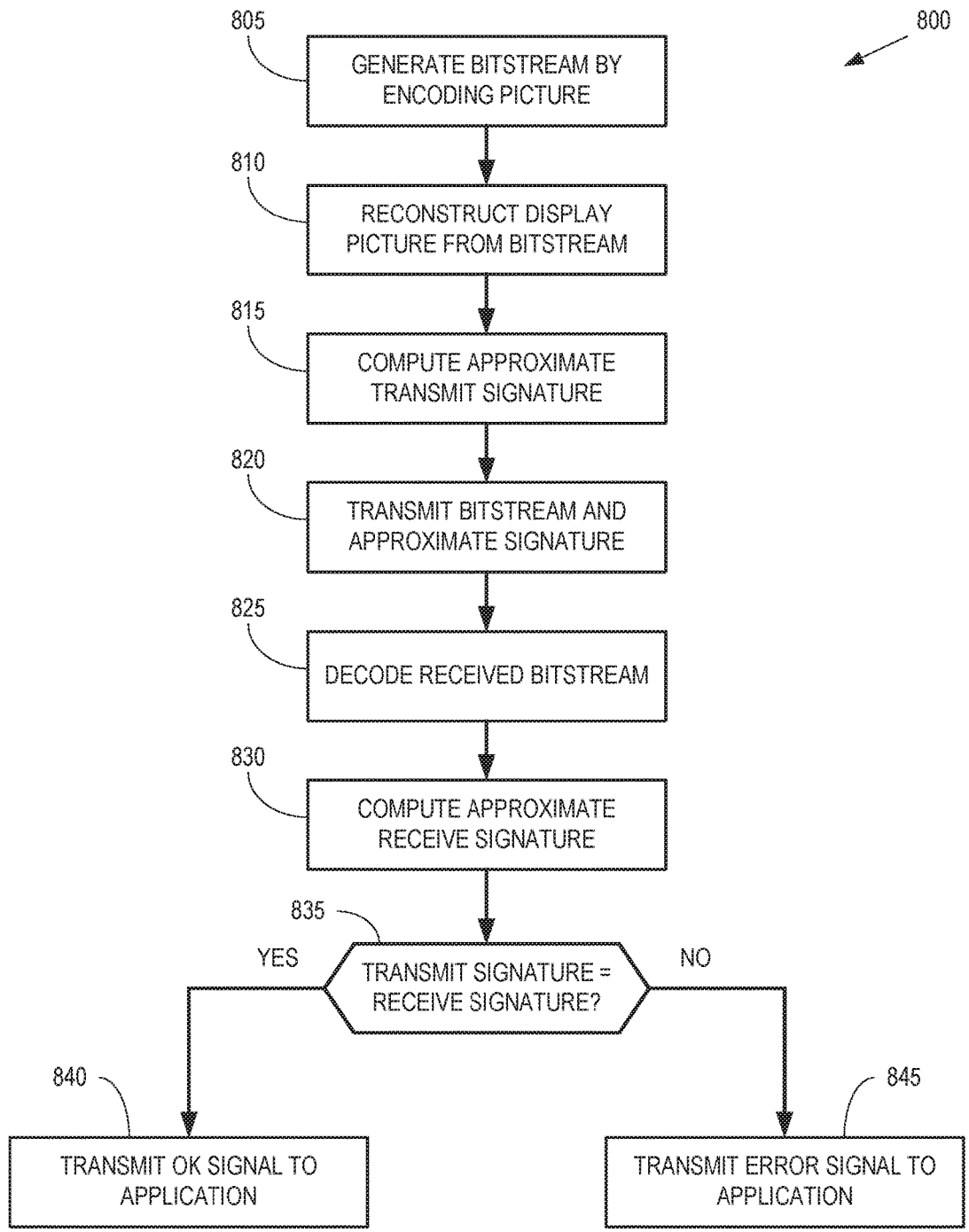
FIG. 8 is a flow diagram of a method for comparing approximate signatures for transmitted and received bitstreams according to some embodiments.

FIG. 8 is a flow diagram of a method 800 for comparing approximate signatures for transmitted and received bitstreams according to some embodiments. The method 800 may be implemented by some embodiments of the communication system 100 shown in FIG. 1 or the communication system 300 shown in FIG. 3. The approximate signatures may be calculated using masked/unmasked bits of the transmitted and received pixels (as illustrated in FIGS. 4 and 5), using averaged pixel values over a pixel block (as illustrated in FIGS. 6 and 7), or using a combination thereof.

At block 805, an encoder generates a bitstream by encoding information representative of a picture. For example, the bitstream may include encoded bits representative of values of pixels in the picture. At block 810, a bitstream representative of a display picture is reconstructed based on the bitstream generated by the encoder at block 805. At block 815, an approximate transmit signature is computed by applying a CRC or other hashing algorithm to the reconstructed bitstream. At block 820, the bitstream generated by the encoder is transmitted with the transmission of the approximate transmit signature.

At block 825, a decoder decodes the bitstream received from the encoder. As discussed herein, the bits in the decoded bitstream may differ from the encoded bits in the transmitted bitstream because of corruption that may occur during transmission of the bitstream over a network between the encoder and the decoder. At block 830, the decoder computes an approximate receive signature by applying the CRC or other hashing algorithm to the decoded bitstream.

At decision block 835, the decoder compares the approximate transmit signature generated based on the encoded bitstream to the approximate receive signature. If the approximate transmit signature is equal to the approximate receive signature, indicating that the severity of any corruption in the bitstream is relatively low, the decoder generates and transmits an OK signal to an application, at block 840. If the approximate transmit signature is different than the approximate receive signature, indicating that the severity of corruption in the bitstream is relatively high, the decoder generates and transmits an error signal to an application, at block 845.

Figure 9:
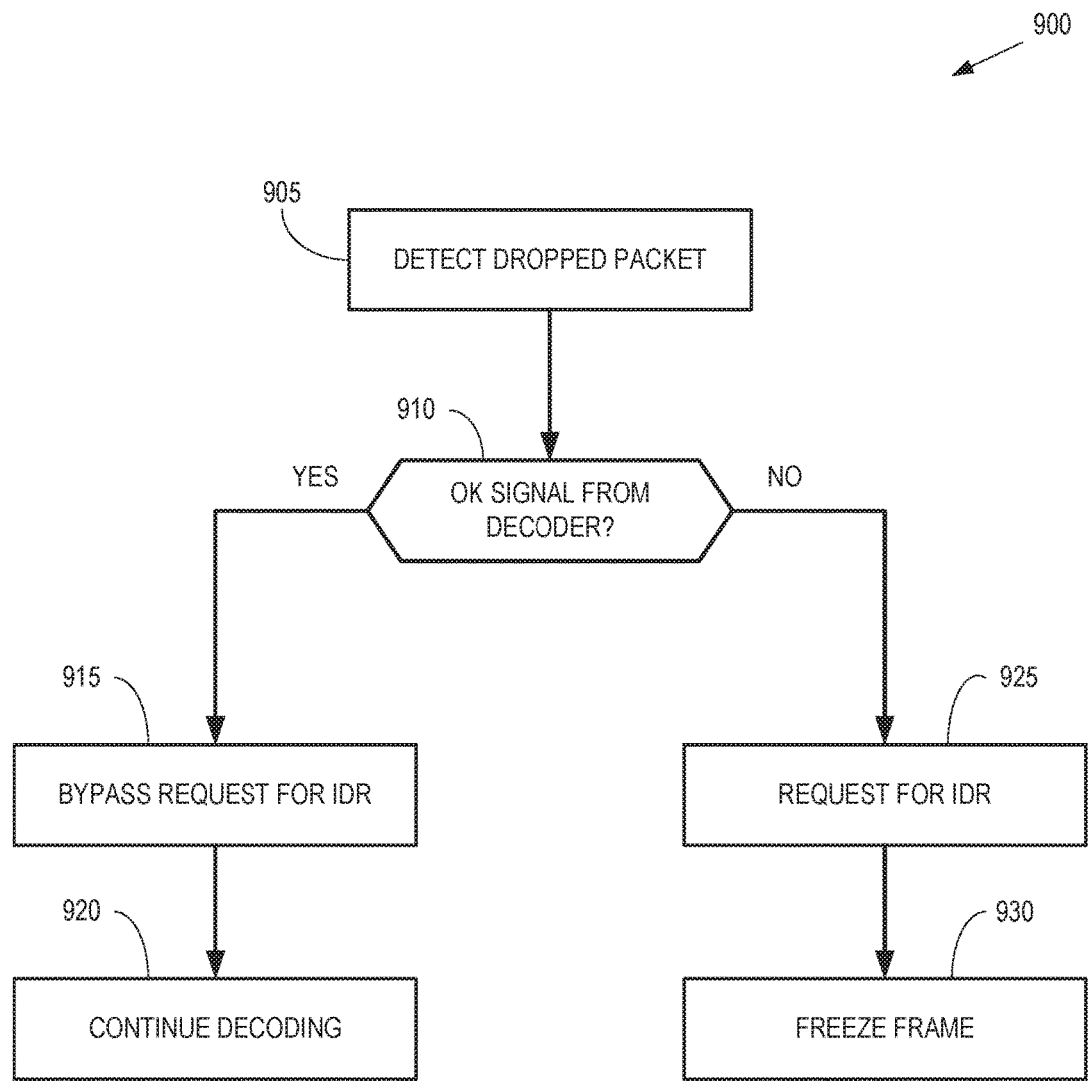
FIG. 9 is a flow diagram of a method for recovering from a dropped or a lost packet according to some embodiments.

FIG. 9 is a flow diagram of a method 900 for recovering from a dropped or a lost packet according to some embodiments. The method 900 may be implemented by some embodiments of the communication system 100 shown in FIG. 1 or the communication system 300 shown in FIG. 3. At block 905, the communication system detects a dropped packet. For example, an application may detect the dropped packet by detecting one or more missing packet numbers or frame numbers in a sequence of successfully received packets. As discussed herein, bits representative of values in pixels in payloads of other packets received by the decoder may be decoded on the basis of a replica of a successfully received packet instead of the dropped packet. Decoding on the basis of the replica may introduce errors, some of which may not be significant and some of which may be significant. In response to detecting the dropped packet, the application may therefore determine how to recover from the dropped packet based on a signal transmitted by a decoder, such as the signals transmitted at block 840 or 845 in FIG. 8.

At decision block 910, the application determines whether an OK signal has been received from the decoder to indicate that any corruption of pixel values in a corresponding decoded packet is less than a threshold. For example, corruption introduced during transmission of the decoded packet or corruption introduced by decoding the packet on the basis of a replica packet may not affect approximate signatures calculated based on masked pixel values or average pixel values over a block of pixels. Thus, if the application receives the OK signal, the application may instruct (at block 915) the decoder to bypass requesting an intra-coded picture, which may be referred to as bypassing an instantaneous decoding refresh (IDR) procedure. At block 920, the decoder continues decoding packets in response to receiving the instruction to bypass requesting the intra-coded picture. However, if the application receives an error signal, indicating that the corruption of pixel values is greater than the threshold, the application instructs the decoder to request an IDR procedure at block 925. At block 930, the application also instructs the decoder to freeze on the current picture or frame and stop decoding until the requested intra-coded picture is received.

Figure 10:
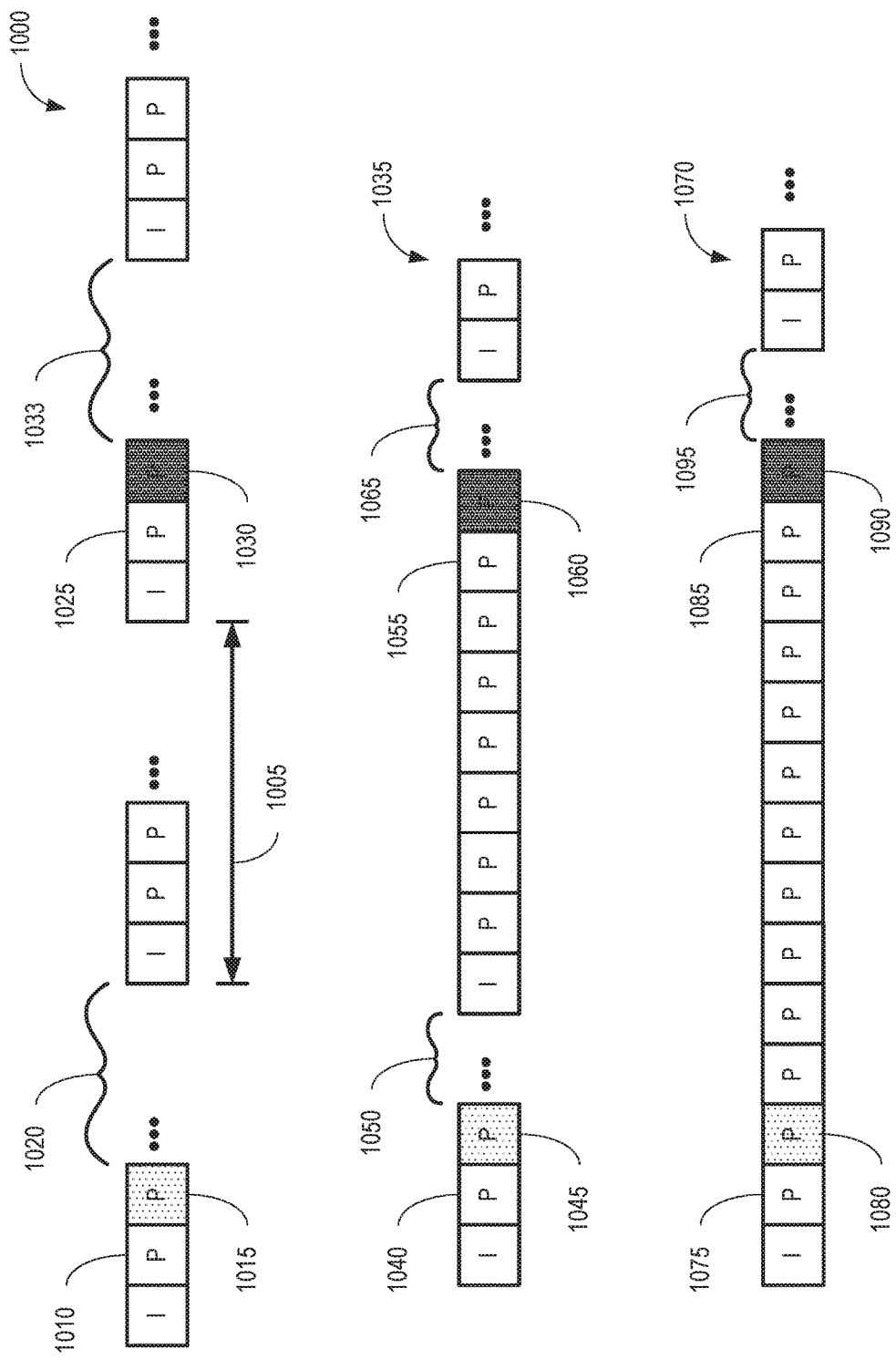
FIG. 10 is a diagram illustrating an example comparison packets transmitted by communication systems that do not provide feedback to request intra-coded frames, communication systems that provide feedback to request intra-coded frames in response to all corrupted packets, and communication systems that selectively request intra-coded frames based on the severity of errors in the corrupted packets according to some embodiments.

FIG. 10 is a diagram illustrating an example comparison of packets transmitted by a communication system that does not provide feedback to request intra-coded frames, a communication system that provides feedback to request intra-coded frames in response to all corrupted packets, and a communication system that selectively requests intra-coded frames based on the severity of errors in the corrupted packets according to some embodiments.

The packet stream 1000 is transmitted in a communication system that does not provide feedback to request intra-coded frames. The packet stream 1000 includes packets (I) with intra-coded pictures and packets (P) with predicted pictures that are encoded on the basis of one or more previously encoded pictures, as discussed herein. Some embodiments of the packet stream 1000 may also include packets with bidirectional predicted pictures. No feedback is provided in response to detecting corrupted packets. Intra-coded pictures are transmitted at a predetermined interval 1005. Requesting the intra-coded pictures at regular intervals 1005 balances the quality drop that results from requesting an intra-coded picture with the need to periodically refresh the state of the decoder to accommodate potentially dropped packets during the predetermined interval 1005.

The packet 1010 includes errors and a network interface detects the corruption in the packet 1010 and drops the packet 1010. The decoder continues to decode the packet 1015 based on a replica of the last successfully received packet. Errors introduced by decoding the packet 1015 based on the replica packet are not very severe, e.g., because the picture represented by pixel values in the packet is not changing dynamically on a time scale that corresponds to the time that elapses between the packets. Thus, continuing to decode packets in the interval 1020 does not significantly impact the quality experienced by a user that views multimedia produced by an application based on the packets decoded during the interval 1020.

The packet 1025 includes errors and the network interface detects the corruption in the packet 1025 and drops the packet 1025. The decoder continues to decode the packet 1030 based on a replica of the last successfully received packet. Errors introduced by decoding the packet 1030 based on the replica packet are severe, e.g., because the picture represented by pixel values in the packet is changing dynamically on a time scale that corresponds to the time that elapses between the packets so that the replica packet differs significantly from the dropped packet 1025. Thus, continuing to decode packets in the interval 1030 significantly impacts the quality experienced by a user that views multimedia produced by an application based on the packets decoded during the interval 1033. However, since the communication system does not provide feedback to request intra-coded pictures, there is no way to avoid this degradation in the quality of the multimedia until the next predetermined intra-coded picture is transmitted.

The packet stream 1035 is transmitted in a communication system that provides feedback to request intra-coded frames in response to detecting corrupted packets. The packet 1040 includes errors and a network interface detects the corruption in the packet 1040 and drops the packet 1040. The decoder freezes the image in response to detecting the dropped packet 1040 and requests a new intra-coded frame. However, in the illustrated embodiment, decoding the packet 1045 based on a replica of the last successfully received packet would not have introduced severe errors, e.g., because the picture represented by pixel values in the packet is not changing dynamically on a time scale that corresponds to the time that elapses between the packets. Thus, freezing the frame and requesting the intra-coded picture unnecessarily incurs a quality drop during the time interval 1050 that elapses between the request for the intra-coded picture and reception of the corresponding I-packet.

The packet 1055 includes errors and the network interface detects the corruption in the packet 1055 and drops the packet 1055. The decoder freezes the image in response to detecting the dropped packet 1055 and requests a new intra-coded frame. In the illustrated embodiment, decoding the packet 1060 based on a replica of the last successfully received packet would introduce severe errors, e.g., because the picture represented by pixel values in the packet is changing dynamically so that the replica packet differs significantly from the dropped packet 1055. Thus, the quality drop during the time interval 1065 that elapses between the request for the intra-coded picture and reception of the corresponding I-packet is a worthwhile cost to avoid the severe degradation in the quality of experience of the user.

The packet stream 1070 is transmitted in a communication system that selectively provides feedback to request intra-coded frames in response to detecting corrupted packets and based on approximate signatures associated with transmitted and received packets. Examples of communication systems that may generate the packet stream 1070 include the communication system 100 shown in FIG. 1 and the communication system 300 shown in FIG. 3.

The packet 1075 includes errors and a network interface detects the corruption in the packet 1075 and drops the packet 1075. A decoder in the communication system also receives the packet 1080 and decodes the packet 1080 based on a replica of the dropped packet 1075. In addition to encoded bits included in the payload of the packet 1080, the decoder receives an approximate signature generated based upon bits representative of the picture represented by the encoded bits in the packet 1080. As discussed herein, the decoder generates a corresponding approximate signature based upon the decoded bits from the packet 1080 and compares the two signatures. In the illustrated embodiment, the severity of errors in the decoded bits from the packet 1080 is below a threshold, as indicated by a match between the two approximate signatures. The decoder therefore bypasses transmitting a request for an intra-encoded frame and continues to decode the subsequently received packets. Thus, the communication system avoids the quality drop that would be incurred during a time interval that elapses between a request for the intra-coded picture and reception of the corresponding I-packet.

The packet 1075 includes errors and a network interface detects the corruption in the packet 1075 and drops the packet 1075. A decoder in the communication system also receives the packet 1080 and decodes the packet 1080 based on a replica of the dropped packet 1075. In addition to encoded bits included in the payload of the packet 1080, the decoder receives an approximate signature generated based upon bits representative of the picture represented by the encoded bits in the packet 1080. As discussed herein, the decoder generates a corresponding approximate signature based upon the decoded bits from the packet 1080 and compares the two signatures. In the illustrated embodiment, the severity of errors in the decoded bits from the packet 1080 is below a threshold, as indicated by a match between the two approximate signatures. The decoder therefore bypasses transmitting a request for an intra-encoded frame and continues to decode the subsequently received packets. Thus, the communication system avoids the quality drop that would be incurred during a time interval that elapses between a request for the intra-coded picture and reception of the corresponding I-packet.

The packet 1085 includes errors and the network interface detects the corruption in the packet 1085 and drops the packet 1085. The decoder also receives the packet 1090 and decodes the packet 1090 based on a replica of the dropped packet 1085. In addition to encoded bits included in the payload of the packet 1090, the decoder receives an approximate signature generated based upon bits representative of the picture represented by the encoded bits in the packet 1090. As discussed herein, the decoder generates an approximate signature based upon the decoded bits from the packet 1090 and compares the two signatures. In the illustrated embodiment, the severity of errors in the decoded bits from the packet 1090 is above a threshold, as indicated by a mismatch between the two approximate signatures. The decoder therefore transmits a request for an intra-encoded frame and stops decoding the subsequently received packets while freezing the frame. Thus, the communication system incurs a quality drop during a time interval 1095 that elapses between a request for the intra-coded picture and reception of the corresponding I-packet. The quality drop is considered worthwhile because it avoids the large degradation in the quality of the user experience that would be caused by the large error accumulation during decoding of frames during the interval 1095.

In some embodiments, the apparatus and techniques described above are implemented in a system comprising one or more integrated circuit (IC) devices (also referred to as integrated circuit packages or microchips), such as the communication systems described above with reference to FIGS. 1-10. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:
1. A method comprising:
    receiving, at a decoder, a first packet including encoded pixels representative of a picture in a multimedia stream;
    receiving, at the decoder, a first approximate signature generated based on approximate values of pixels in a copy of the picture, wherein the copy of the picture is reconstructed by decoding the encoded pixels prior to transmission of the encoded pixels to the decoder;
    decoding the encoded pixels at the decoder;

generating, at the decoder, a second approximate signature based on approximate values of the decoded pixels; and transmitting, from the decoder, a first signal in response to comparing the first approximate signature and the second approximate signature.

2. The method of claim 1, further comprising:

generating, at the decoder, the approximate values of the decoded pixels by masking a subset of a plurality of bits representative of the decoded pixels.

3. The method of claim 1, further comprising:

generating, at the decoder, the approximate values of the decoded pixels by grouping subsets of the pixels into blocks and averaging the values of the pixels in the blocks.

4. The method of claim 1, further comprising:

generating, at the decoder, the second approximate signature by at least one of: hashing the approximate values of the pixels; or applying a cyclic redundancy check (CRC) to the approximate values of the pixels.

5. The method of claim 1, further comprising:

replicating a second packet to replace a corrupted third packet, wherein the first packet was encoded based on the third packet, and wherein decoding the encoded pixels in the first packet comprises decoding the encoded pixels in the first packet based on encoded pixels in the second packet.

6. The method of claim 5, wherein transmitting the first signal comprises transmitting a first signal that indicates whether the first approximate signature is equal to the second approximate signature.

7. The method of claim 6, further comprising:

receiving, at the decoder, a second signal in response to transmitting the first signal and in response to detecting corruption of the third packet.

8. A method comprising:

receiving, at a decoder, a first packet including encoded pixels representative of a picture in a multimedia stream;

receiving, at the decoder, a first approximate signature generated based on approximate values of pixels in a reconstructed copy of the picture;

decoding the encoded pixels at the decoder;

transmitting, from the decoder, a first signal in response to comparing the first approximate signature and a second approximate signature generated based on approximate values of the decoded pixels, wherein transmitting the first signal comprises transmitting a first signal that indicates whether the first approximate signature is equal to the second approximate signature;

replicating a second packet to replace a corrupted third packet, wherein the first packet was encoded based on the third packet, and wherein decoding the encoded pixels in the first packet comprises decoding the encoded pixels in the first packet based on encoded pixels in the second packet receiving, at the decoder, a second signal in response to transmitting the first signal and in response to detecting corruption of the third packet; and wherein receiving the second signal comprises receiving instructions to request an intra-coded picture in response to the first approximate signature differing from the second approximate signature.

9. The method of claim 8, wherein receiving the second signal comprises receiving, in response to the first approximate signature being equal to the second approximate signature, instructions to bypass requesting an intra-coded picture and to continue decoding received packets.

10. The method of claim 1, further comprising:

receiving, at a multimedia application, the first signal; and transmitting, from the multimedia application to the decoder, a second signal in response to receiving the first signal and in response to corruption of a second packet.

11. A method comprising:

receiving, at a decoder, a first packet including encoded pixels representative of a picture in a multimedia stream;

receiving, at the decoder, a first approximate signature generated based on approximate values of pixels in a reconstructed copy of the picture;

decoding the encoded pixels at the decoder;

transmitting, from the decoder, a first signal in response to comparing the first approximate signature and a second approximate signature generated based on approximate values of the decoded pixels, receiving, at a multimedia application, the first signal; and transmitting, from the multimedia application to the decoder, a second signal in response to receiving the first signal and in response to corruption of a second packet, wherein transmitting the second signal comprises transmitting instructions to request an intra-coded picture in response to the first signal indicating that the first approximate signature differs from the second approximate signature.

12. The method of claim 10, wherein transmitting the second signal comprises transmitting, in response to the first approximate signature being equal to the second approximate signature, instructions to bypass requesting an intra-coded picture and to continue decoding received packets.

13. A method comprising:

encoding, at an encoder, pixels representative of a picture in a multimedia stream;

decoding, at the encoder, the encoded pixels to generate pixels representative of a copy of the picture;

generating, at the encoder, a first approximate signature based on approximate values of the pixels in the copy of the picture; and transmitting, from the encoder, the encoded pixels and the first approximate signature further comprising: generating, at the encoder, the first approximate signature by at least one of hashing the approximate values of the pixels or applying a cyclic redundancy check (CRC) to the approximate values of the pixels.

14. The method of claim 13, further comprising:

generating, at the encoder, the approximate values of the pixels by masking a subset of a plurality of bits representative of the pixels.

15. The method of claim 13, further comprising:

generating, at the encoder, the approximate values of the pixels by grouping subsets of the pixels into blocks and averaging the values of the pixels in the blocks.

16. A method comprising:

encoding, at an encoder, pixels representative of a picture in a multimedia stream;

generating, at the encoder, a first approximate signature based on approximate values of pixels in a reconstructed copy of the picture;

transmitting, from the encoder, the encoded pixels and the first approximate signature; and receiving, at the encoder, instructions to generate an intra-coded picture in response to the first approximate signature differing from a second approximate signature generated based on approximate decoded values of the pixels.

17. The method of claim 13, further comprising:
encoding, at the encoder, an intra-coded picture in response to receiving the instructions; and
transmitting, from the encoder, the intra-coded picture.

18. An apparatus comprising:
a decoder configured to:
  receive a first packet including encoded pixels representative of a picture in a multimedia stream;
  receive a first approximate signature generated based on approximate values of pixels in a copy of the picture, wherein the copy of the picture is reconstructed by decoding the encoded pixels prior to transmission of the encoded pixels to the decoder;
  decode the encoded pixels;
  generate a second approximate signature based on the decoded pixels; and
  transmit a first signal in response to comparing the first approximate signature and the second approximate signature.

19. The apparatus of claim 18, further comprising:
at least one processor configured to implement a multimedia application to receive the first signal and transmit a second signal to the decoder in response to receiving the first signal and in response to corruption of a second packet.

* * * * *